Oct. 4, 1966  W. G. KEENEY, JR  3,276,263
SAMPLER
Filed Jan. 23, 1964  2 Sheets-Sheet 1

WILLIAM G. KEENEY, JR.
INVENTOR.

BY *William S. Jackson*

ATTORNEY

WILLIAM G. KEENEY, JR.
INVENTOR.

BY William D. Jackson
ATTORNEY

United States Patent Office 3,276,263
Patented Oct. 4, 1966

3,276,263
SAMPLER
William G. Keeney, Jr., Bakersfield, Calif., assignor to Mobil Oil Corporation, a corporation of New York
Filed Jan. 23, 1964, Ser. No. 339,763
9 Claims. (Cl. 73—422)

This invention relates to fluid samplers and fail-safe means therefor and more particularly to a positive-displacement type sampled having fail-safe means responsive to the failure of the sampler to obtain periodically samples of a predetermined quantity from a fluid system.

In fluid distribution systems, it often is desirable to obtain samples of the fluid in the system. For example, in the oil industry, oil from a lease normally is sampled as it is delivered to the pipeline in order to determine its quality. This often is accomplished by means of a tap in the delivery line which is opened periodically to allow a sample of the fluid to drain from the line to a suitable container. While this arrangement is adequate in many cases, it often proves unsatisfactory for systems handling relatively viscous liquids. In such systems, it is conventional to utilize positive-displacement type samplers which positively eject a sample of liquid from the line into the sample container. While the positive-displacement type samplers now available have met with some success, they are often rather complex and, in addition, they may tend to obstruct fluid flow through the line.

It is an object of the present invention to provide a sampler which positively displaces a definite quantity of fluid from the flow line and yet is relatively simple and offers a minimal obstruction to fluid flow.

In fluid distribution systems, obvious advantages are involved in carrying out the sampling and other operations attendant to the transfer of fluids automatically rather than manually. In the oil industry, for example, oil often is delivered from a lease to a pipeline by means of an ACT (Automatic Custody Transfer) unit which includes a pump for delivering oil to the pipeline and means for measuring and sampling the oil thus delivered. It is old to provide such a system with fail-safe means which will shut down the system upon malfunction of the sampler. In the past, however, these fail-safe means have been responsive only to the mechanical failure of the sampler. While these means have offered a measure of protection, they have not proved to be completely fail-safe since a sampler may fail to obtain a sample of the desired quantity for reasons other than mechanical malfunction, e.g., the high viscosity of the oil.

It is therefore another object of the instant invention to provide fail-safe means for a sampler which is not dependent upon mechanical malfunction of the sampler, but which is responsive to the failure of the sampler to obtain a sample of a predetermined size, regardless of the cause.

In carrying out the invention, a sampler is provided which periodically transfers a sample of fluid from a conduit to a sampler-receiving chamber and which includes novel means for shutting down fluid flow through the conduit upon the failure of a specified quantity of fluid to accumulate in the chamber within a predetermined time period.

In a preferred embodiment of the invention, a sampler is provided having a flow passage which is adapted to be interconnected in a flow line. A piston chamber having a charging piston slidably disposed therein opens into the flow passage and a second passage opens into the flow passage at a point opposite the chamber. A normally closed valve is disposed in the second passage and is adapted to be opened upon the projection of the charging piston into the second passage. Means are provided for periodically projecting the piston through the flow passage and into the second passage whereby a sample of fluid is positively displaced past the valve and ultimately into a sample container.

For a more detailed description of the instant invention reference may be had to the accompanying drawings in which.

Figure 1:
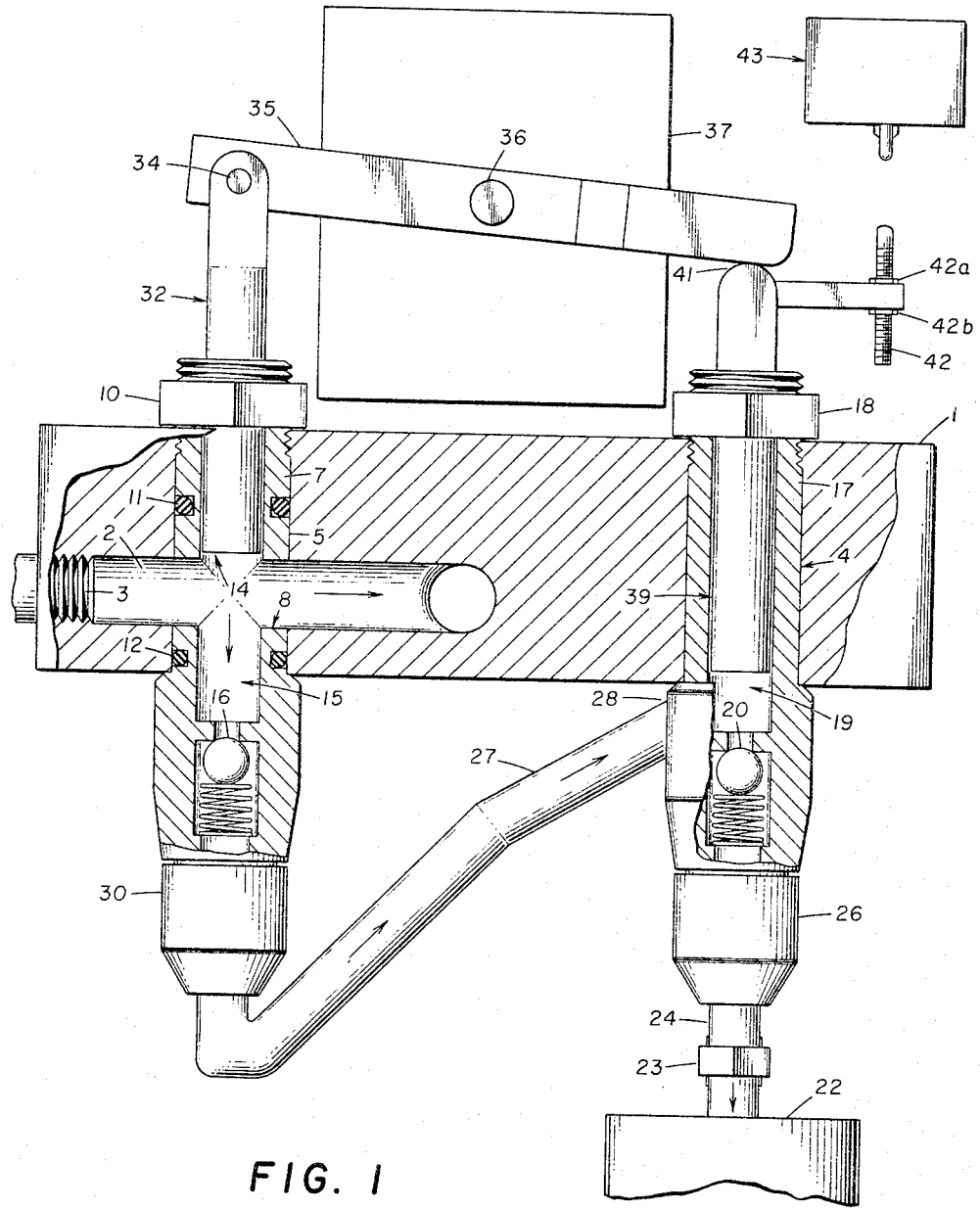
FIGURE 1 is a view partly in section of a sampler embodying the present invention.

Referring to FIGURE 1, there is shown a sampler in accordance with the instant invention which comprises a flow passage adapted to be interconnected in a flow line or conduit. The sampler includes a piston chamber opening into the flow passage and a second passage opening into the flow passage at a point opposite the piston chamber. A charging piston is slidably disposed in the piston chamber and means are provided for projecting the piston through the flow passage into the second passage. When the piston is projected into the second passage, a sample of fluid is displaced into a secondary or sample-receiving chamber having a valved outlet. A discharging piston is slidably disposed in the secondary chamber. As fluid enters the secondary chamber, the discharging piston is displaced outwardly away from the outlet for a predetermined distance. Thereafter, the charging piston is withdrawn from the second passage and the discharging piston is forced inwardly toward the valved outlet of the secondary chamber, thus displacing the fluid therein into a sample container.

More particularly, and with reference to FIGURE 1, the sampler includes a housing 1 having a flow passage 2 extending therethrough. The passage 2 is provided with threaded connections at the ends thereof such as that shown by the reference numeral 3. The housing also includes a bore 4 extending transversely thereof and a bore 5 extending transversely thereof and interconnecting the flow passage 2.

The bore 5 is adapted to receive an insert 7 having diametrically opposed openings 8 through the walls thereof which coincide with passage 2 when the insert is in place. Insert 7 is secured in the housing by means of a lock nut 10 and carries O-rings 11 and 12 in order to insure a fluid-tight seal between the insert and housing. The upper portion of the insert defines a piston chamber 14 and the lower portion forms a piston-receiving chamber 15 which is closed at its lower end by a spring-biased check valve 16.

An insert 17 is removably secured in bore 4 by means of a lock nut 18 similarly as insert 7. The interior of insert 17 forms a secondary or sample-receiving chamber 19. The outlet of the secondary chamber 19 is closed by a spring-biased check valve 20. The valved outlet of the secondary chamber opens into a sample container 22 which is connected to the insert by means of a union 23, a conduit 24, and a threaded coupling 26. A conduit 27 is threadedly secured at one end to the inlet 28 of chamber 19. The other end of the conduit is secured to the outlet of chamber 15 by means of a threaded coupling 30. Conduit 27, coupling 30, and the lower portion of insert 7 thus form a passage which extends from the inlet of chamber 19 and opens into flow passage 2.

A charging piston 32 is slidably disposed in chamber 14 such that it may be projected through passage 2 into chamber 15. Piston 32, which is shown in the drawing in its normal or nonsampling position, is of a size such that it forms a substantially fluid-tight seal with the walls of chamber 15 when in the lower or inward position. The outer portion of piston 32 is pivotally connected to an actuating arm 35 by means of a pin 34. The actuating arm is keyed to the shaft 36 of a motor 37 which is connected in a hereinafter-described control circuit such that the direction of rotation of shaft 36 may be reversed periodically.

A piston 39 is slidably disposed in chamber 19 in a substantially fluid-tight relationship with the walls thereof. The upper end of piston 39 abuts one end of arm 35 as shown at 41. Piston 39 also is provided with an adjustable control rod 42 which is adapted to contact a switch 43 in the control circuit when the piston is in its outward position. Control rod 42 is threaded externally and secured to piston 39 by means of nuts 42a and 42b such that the piston travel required for rod 42 to contact switch 43 may be varied.

The term "substantially fluid tight" as used herein and in the appended claims is intended to define a relationship between the pistons and their respective chambers such that little or none of the fluid for which the sampler is designed will bypass the pistons. For example, in a sampler designed to handle viscous oils, piston 32 will be in a substantially fluid-tight relationship with the walls of chamber 15 if little or none of the oil will bypass the piston during its downward movement, even though relatively large amounts of a much less viscous fluid such as air would bypass the piston. As a practical matter, of course, the chambers and their respective pistons should be made to close tolerances so as to allow little or no bypassing even of air.

The operation of the instant sampler is as follows. With the sampler interconnected in a flow line, a portion of the fluid flowing through passage 2 will accumulate in chamber 15. Motor 37 is energized through the hereinafter-described control circuit and acts through a counterclockwise rotation of shaft 36 and arm 35 to project piston 32 through passage 2 and into the piston-receiving chamber 15. As piston 32 enters chamber 15, the fluid therein is forced past valve 16 and through conduit 27 into the sample-receiving chamber 19. As the fluid enters this chamber, piston 39 is forced upwardly until rod 42 contacts switch 43. The pressure required to open valve 20 is greater than that required to lift piston 39 so that this valve will remain closed during the upward movement of the piston. When rod 42 contacts switch 43, the direction of rotation of the motor shaft is reversed and arm 35 begins to rotate in a clockwise direction to withdraw piston 32 from the chamber 15 and the passage 2 and to force discharge piston 39 inwardly. At this time the pressure in chamber 19 is sufficient to open valve 20 and a sample of fluid flows past the valve into the sample container 22.

From the above description, it will be recognized that the pressure required to open valve 16 should be greater than the pressure on the fluid flowing through passage 2 so that the valve will not be opened before piston 32 is projected into chamber 15. Also, depending upon the capacity of the passage extending from the outlet of chamber 15 to the inlet of chamber 19, it may be necessary to prime this passage with fluid prior to starting operations with the sampler.

Figure 2:
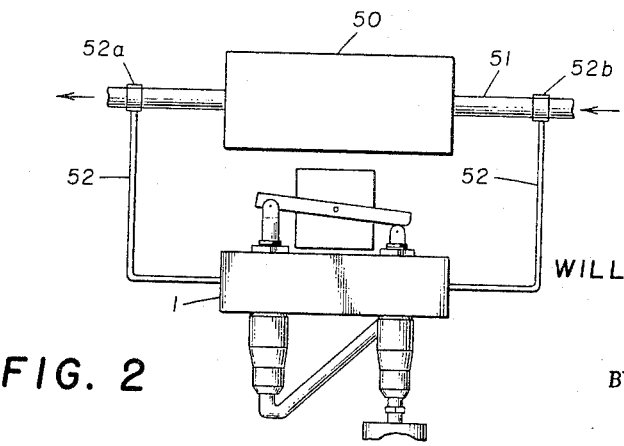
FIGURE 2 is a view of a preferred installation of the sampler in a fluid distribution system.

In FIGURE 2 there is shown a preferred installation of the sampler in a fluid distribution system such that it offers a minimal obstruction to fluid flow through the system. This system includes a shipping pump 50 for transferring a fluid, e.g., oil, through a conduit 51 from a delivery point such as a tank (not shown) to a pipeline junction (not shown) or other suitable terminal. The shipping pump is driven by an electric motor 50a (FIGURE 3) which may be started and stopped by means of a simple "on-off" switch or through automatic controls which are responsive to factors such as the fluid level in the delivery tank and the quality of the fluid flowing through the conduit. Since such controls are conventional and form no part of the instant invention, they will not be described further.

As shown in FIGURE 2, a bypass line or conduit 52 extends from a T-coupling 52a in conduit 51 on the discharge side of pump 50 to a T-coupling 52b in the conduit on the input side of the pump. The housing 1 is connected in the bypass line by means of the threaded end portions of flow passage 2. The flow passage 2 thus defines a portion of bypass line 52 and is in fluid communication with the discharge and input sides of pump 50 so that a small portion of the fluid being pumped through flow line 51 is circulated continuously through the sampler. Thus, in this arrangement, when the charging piston traverses the flow passage it does not obstruct fluid flow through the main flow line.

The operation of the installation shown in FIGURE 2 will now be described in greater detail with respect to FIGURE 3 which is a schematic diagram of the control system therefor. The control system includes means for automatically activating the sampler and means for automatically shutting down pump 50 upon the failure of the sampler to obtain a sample of fluid of predetermined quantity within a predetermined time period.

Figure 3:
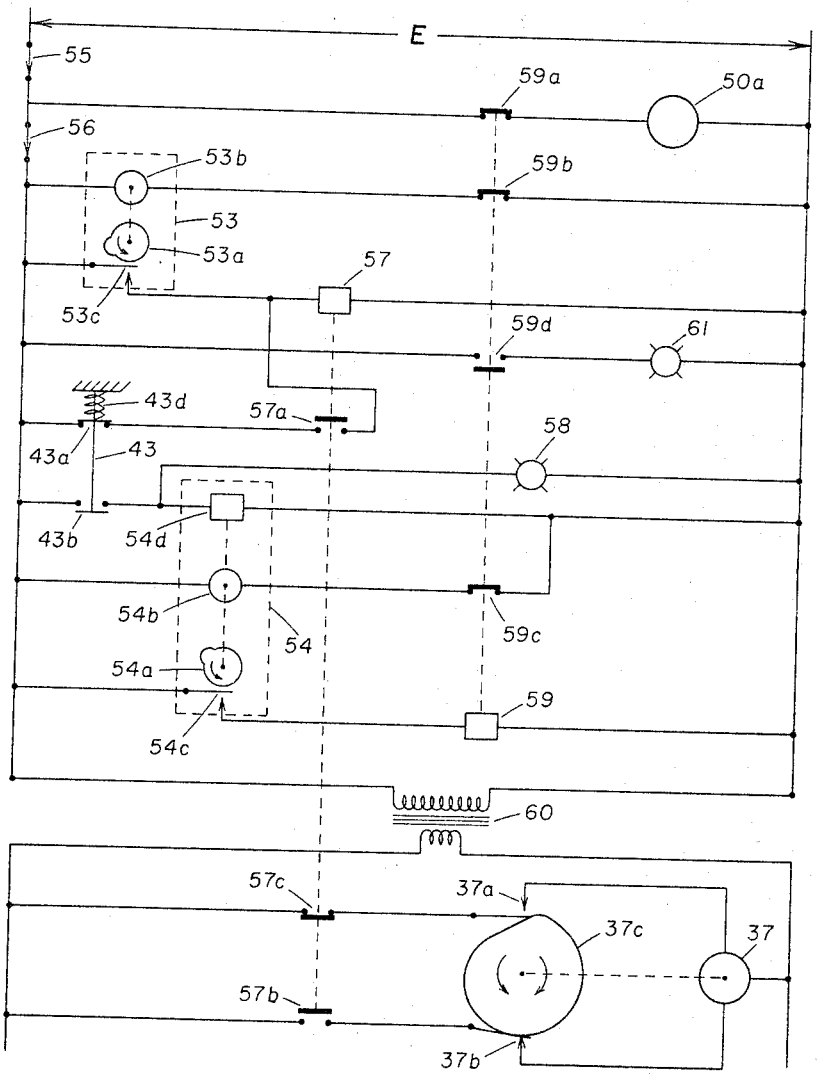
FIGURE 3 is a schematic diagram of the control circuit for the system shown in FIGURE 2.

In the control system shown in FIGURE 3, the shipping-pump motor 50a is connected across a voltage source E and the sampler motor 37 is connected across the secondary coil of a step-down transformer 60. The sampler motor 37 is provided with reversible terminal contacts 37a and 37b such that the direction of the motor shaft may be reversed. The motor turns in a clockwise direction when energized through contact 37a and in a counterclockwise direction when energized through contact 37b. Contacts 37a and 37b are controlled by a cam 37c which is mounted on the shaft motor 37 for rotation therewith. The sampler motor and cam arrangement per se is conventional and a suitable motor, including the cam, is available from Minneapolis Honeywell Regulator Co., Minneapolis, Minnesota, as Model No. U 904E.

The control system also includes a start timer 53 for periodically activating the sampler and a stop timer 54 which acts to de-energize the shipping-pump motor in the event the sampler does not operate properly. Timer 53 includes a cam 53a which is driven by a motor 53b and functions to close a normally open contact 53c at predetermined intervals, e.g., once every five minutes. Stop timer 54 includes a cam 54a which functions to close a normally open contact 54c when it times out and a motor 54b. Timer 54, in addition, includes a reset clutch 54d which acts to reset cam 53a to the starting position when the clutch is energized. Like the sampler motor, timers 53 and 54 are conventional. A suitable start timer may be obtained from Automatic Electric Sales Corp., Northlake, Illinois, as Model No. PY 193–137, and a suitable stop timer is available from Cramer Division, Giannini Controls Corp., Centerbrook, Connecticut, as Model No. 412E-5M.

The operation of the control system is as follows. A switch 55 is closed in order to energize shipping-pump motor 50a and initiate fluid flow through conduit 51. Thereafter, a sampler switch 56 is closed in order to activate the sampler control system. Upon the closing of switch 56, timer motor 53b is energized and cam 53a begins to rotate in a counterclockwise direction. When cam 53a closes contact 53c, a circuit is completed through a relay 57 which then acts to close contacts 57a and 57b and to open contact 57c. With contact 57a closed, relay 57 will remain energized after contact 53c is again opened by the continued rotation of cam 53a.

With contact 57b closed, motor 37 is energized through terminal contact 37b and piston 32 (FIGURE 1) is projected downwardly to displace fluid through the passage defined by chamber 15 and conduit 27 into chamber 19. Cam 37c which initially is in the position shown in FIGURE 3 rotates in a counterclockwise direction and ultimately closes contact 37a while at the same time holding contact 37b closed.

The sampler motor will continue its counterclockwise rotation until rod 42 contacts switch 43 which normally is biased to the position shown in FIGURE 3 by a compression spring 43d. The control rod moves switch 43 upwardly against the bias of spring 43d to open contact 43a and close contact 43b. With contact 43a open, relay 57 is de-energized and closes and opens contacts 57c and 57b respectively, thus opening the circuit through terminal contact 37b and closing the circuit through terminal contact 37a. Motor 37 will then rotate in a clockwise direction, thus acting through arm 35 to force piston 39 inwardly. As piston 39 moves inwardly, it dispels a sample of fluid from chamber 19 into the sample container 22. The motor continues its clockwise rotation until cam 37c reaches the position shown in FIGURE 3 at which time contact 37a is opened and the motor is de-energized. When cam 53a makes a complete revolution to again close contact 53c, motor 37 is energized through contacts 57b and 37b and the above-described cycle of operations is repeated.

As noted above, control rod 42 acts through switch 43 to momentarily close contact 43b when the discharging piston 39 reaches its outermost position. With contact 43b closed, a circuit is completed through the reset clutch 54d of the stop timer and also through a "sampler-working" beacon 58. Clutch 54d then acts to reset the timer back to its starting or "zero time" position. The period required for cam 54a to time out, i.e., close contact 54c, is of course longer than the period required for cam 53a to complete a revolution so that contact 54c remains open so long as the sampler is operating properly.

In the embodiment illustrated, the sampler is actuated on a time-interval basis by means of timer 53. However, it will be recognized that the sampler may be actuated periodically in response to the flow rate through conduit 51 rather than at a definite time interval. For example, cam 53a could be driven by a positive-displacement type meter in conduit 51 such that contact 53c is closed each time a unit volume, e.g., one barrel, passes through the meter. Various arrangements for periodically activating a sampler in response to metered flow rates are well known to those skilled in the art and therefore will not be discussed further.

Should the sampler fail for any reason to deliver a predetermined quantity of fluid to chamber 19 within the time-out period set into timer 54, the control system will function to de-energize shipping-pump motor 50a, thus terminating fluid flow through conduit 51. This operation of the system is as follows. Control rod 42 will fail to trip switch 43 and contact 43b will remain open. Cluth 54d therefore will not be energized and cam 54a will continue its counterclockwise rotation and ultimately close contact 54c. With contact 54c closed, a relay 59 is energized and acts to open a contact 59a, thus breaking the circuit through motor 50a and shutting down the pump. Relay 59 also opens contacts 59b and 59c to stop timers 53 and 54 respectively, and closes a contact 59d to energize a "sample-failure" beacon 61.

Having described specific embodiments of the invention, it is understood that various modifications thereof may be suggested to those skilled in the art, and it is intended to cover all such modifications as fall within the scope of the appended claims.

I claim:

1. A sampling apparatus comprising means forming a flow passage adapted to be interconnected in a flow line, means forming a piston chamber opening into said flow passage, a charging piston slidably disposed in said chamber, means forming a second passage opening into said flow passage at a point opposite said chamber and adapted to receive said piston in a substantially fluid-tight relationship, said piston being normally disposed in a position in which it does not traverse said flow passage and extend into said second passage, normally closed valve means disposed in said second passage and adapted to be opened upon the projection of said piston into said second passage, and means operatively connected with said piston for projecting said piston through said flow passage into said second passage whereby a sample of fluid is displaced past said valve means.

2. The sampling apparatus of claim 1 wherein said valve means comprises a spring-biased check valve.

3. A sampling apparatus comprising means forming a flow passage adapted to be interconnected in a flow line, means forming a piston chamber opening into said flow passage, a charging piston slidably disposed in said chamber, means forming a secondary chamber, means forming a second passage having an intake end opening into said flow passage at a point opposite said piston chamber and adapted to receive said charging piston in a substantially fluid-tight relationship and a discharge end opening into said secondary chamber, said piston being normally disposed in a position in which it does not traverse said flow passage and extend into said second passage, a check valve disposed in said second passage intermediate the intake and discharge ends thereof, means operatively connected with said piston for projecting said piston through said flow passage and into the intake end of said second passage whereby fluid is forced past said check valve into said secondary chamber, and means in said secondary chamber for producing a signal upon the accumulation of a predetermined quantity of fluid in said secondary chamber.

4. A sampling apparatus comprising means forming a first passage adapted to be fluidly interconnected in a flow line, means forming a piston chamber opening into said passage, a charging piston slidably disposed in said chamber, means forming a secondary chamber having an inlet and an outlet, a check valve at said outlet, a discharge piston slidably disposed in said secondary chamber, means forming a second passage having an intake end opening into said first passage at a point opposite said piston chamber and adapted to receive said charging piston in a substantially fluid-tight relationship and a discharge end opening into the inlet of said secondary chamber, a check valve disposed in said second passage intermediate the intake and discharge ends thereof, means operatively connected with said charging piston for projecting said charging piston into the intake end of said second passage whereby fluid from said first passage is forced into said secondary chamber and moves said discharge piston outwardly, and means responsive to the displacement of said discharge piston a predetermined distance for withdrawing said charging piston from the intake end of said second passage and for displacing said discharge piston inwardly whereby fluid in said secondary chamber is forced through the outlet thereof.

5. In a fluid distribution system, a fluid-carrying conduit, means forming a sample-receiving chamber, means fluidly interconnecting said conduit and said sample-receiving chamber for periodically transferring a sample of fluid from said conduit to said chamber, and means responsive to the failure of a predetermined quantity of fluid to accumulate in said chamber within a predetermined time period for terminating fluid flow through said conduit.

6. In a fluid distribution system, a fluid-carrying conduit, means forming a sample-receiving chamber, means forming a passage extending from said conduit to said chamber, normally closed valve means in said passage, means for periodically opening said valve means whereby a sample of fluid from said conduit may flow through said passage into said sample-receiving chamber, and means responsive to the failure of a predetermined quantity of fluid to accumulate in said chamber within a predetermined time period for terminating fluid flow through said conduit.

7. In a fluid distribution system, a fluid-carrying conduit, means forming a sample-receiving chamber, means fluidly interconnecting said conduit and said sample-receiving chamber for periodically transferring a sample of fluid from said conduit to said chamber, an outlet for said chamber, normally closed valve means in said outlet, means for opening said valve means upon the accumulation of a predetermined quantity of fluid in said chamber whereby said fluid may be transferred from said chamber to a sample container, and means responsive to the failure of a predetermined quantity of fluid to accumulate in said chamber within a predetermined time period for terminating fluid flow through said conduit.

8. In a fluid distribution system, a conduit, means in said conduit for pumping fluids therethrough, means forming a flow passage having an inlet end in fluid communication with the discharge side of said pumping means and an outlet end in fluid communication with the input side of said pumping means whereby a portion of the fluid flowing in said conduit is circulated through said passage, means forming a piston chamber opening into said flow passage, a charging piston slidably disposed in said chamber, means forming a second passage opening into said flow passage opposite said chamber and adapted to slidably receive said piston in a substantially fluid-tight relationship, said piston being normally disposed in a position in which it does not traverse said flow passage and extend into said second passage, normally closed valve means disposed in said second passage and adapted to be opened upon the projection of said piston into said second passage, and means operatively connected with said piston for projecting said piston through said flow passage and into said second passage whereby a sample of fluid is displaced past said valve means.

9. In a fluid distribution system, a conduit, means in said conduit for pumping fluids therethrough, means forming a flow passage having an inlet end in fluid communication with the discharge side of said pumping means and an outlet end in fluid communication with the input side of said pumping means whereby a portion of the fluid flowing in said conduit is circulated through said passage, means forming a piston chamber opening into said flow passage, a charging piston slidably disposed in said piston chamber, means forming a secondary chamber, means forming a second passage having an intake end opening into said flow passage at a point opposite said piston chamber and adapted to receive said charging piston in a substantially fluid-tight relationship and a discharge end opening into said secondary chamber, normally closed valve means disposed in said second passage intermediate the intake and discharge ends thereof and adapted to be opened upon the projection of said piston into said second passage, means operatively connected with said piston for projecting said piston through said flow passage and into said second passage, means for periodically activating said last-named means whereby a sample of fluid is periodically displaced past said valve means into said secondary chamber, timing means for shutting down said pumping means upon the expiration of a predetermined time period, and reset means responsive to the accumulation of a predetermined quantity of fluid in said secondary chamber for resetting said timing means back to a reference time.

References Cited by the Examiner
UNITED STATES PATENTS

| | | | |
|---|---|---|---|
| 2,426,369 | 8/1947 | Paulsen | 73—422 |
| 2,626,385 | 1/1953 | Schuman | 340—239 |
| 2,836,978 | 6/1958 | Warren | 73—422 |
| 2,925,735 | 2/1960 | Tapp et al. | 73—422 |
| 3,101,619 | 8/1963 | Hunter | 73—422 |

LOUIS R. PRINCE, *Primary Examiner.*

S. C. SWISHER, *Assistant Examiner.*